(12) United States Patent
Lee et al.

(10) Patent No.: US 10,313,065 B2
(45) Date of Patent: Jun. 4, 2019

(54) METHOD FOR TRANSMITTING A MAC PDU ON SL-DCH IN A D2D COMMUNICATION SYSTEM AND DEVICE THEREFOR

(71) Applicant: LG Electronics Inc., Seoul (KR)

(72) Inventors: Sunyoung Lee, Seoul (KR); Youngdae Lee, Seoul (KR); Seungjune Yi, Seoul (KR); Sunghoon Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 15 days.

(21) Appl. No.: 15/542,759

(22) PCT Filed: Jan. 21, 2016

(86) PCT No.: PCT/KR2016/000643
§ 371 (c)(1),
(2) Date: Jul. 11, 2017

(87) PCT Pub. No.: WO2016/122162
PCT Pub. Date: Aug. 4, 2016

(65) Prior Publication Data
US 2018/0013521 A1 Jan. 11, 2018

Related U.S. Application Data

(60) Provisional application No. 62/109,000, filed on Jan. 28, 2015.

(51) Int. Cl.
*H04L 1/18* (2006.01)
*H04L 29/08* (2006.01)
*H04W 88/02* (2009.01)
*H04W 92/18* (2009.01)

(52) U.S. Cl.
CPC .......... *H04L 1/1851* (2013.01); *H04L 1/1812* (2013.01); *H04L 69/324* (2013.01); *H04W 88/02* (2013.01); *H04W 92/18* (2013.01)

(58) Field of Classification Search
CPC .................................................... H04L 1/1851
USPC ......................................................... 370/310
See application file for complete search history.

(56) References Cited

U.S. PATENT DOCUMENTS

| 7,450,511 | B2 | 11/2008 | Jang |
| 8,386,870 | B2 | 2/2013 | Graumann |
| 8,428,014 | B2 | 4/2013 | Cave et al. |
| 8,477,604 | B2 | 7/2013 | Torsner et al. |
| 8,625,486 | B2 | 1/2014 | Wang et al. |
| 2009/0204862 | A1* | 8/2009 | Chun ............... H04L 1/1822 714/748 |
| 2009/0235139 | A1* | 9/2009 | Park ............... H04L 1/1819 714/750 |

(Continued)

*Primary Examiner* — Samina F Choudhry
(74) *Attorney, Agent, or Firm* — Dentons US LLP

(57) ABSTRACT

The present invention relates to a wireless communication system. More specifically, the present invention relates to a method and a device for transmitting a MAC PDU on SL-DCH in a D2D communication system, the method comprising: configuring a first counter to count a number of transmissions within a transmission period; configuring a second counter to count a number of transmission periods; keeping a Medium Access Control (MAC) Protocol Data Unit (PDU) in a MAC entity until the first counter reaches a first maximum value and the second counter reaches a second maximum value; and transmitting the MAC PDU.

12 Claims, 9 Drawing Sheets

(56) References Cited

U.S. PATENT DOCUMENTS

| | | | |
|---|---|---|---|
| 2011/0205926 A1* | 8/2011 | Torsner | H04L 1/1685 |
| | | | 370/252 |
| 2016/0191375 A1* | 6/2016 | Gopala Krishnan | H04L 45/22 |
| | | | 370/217 |
| 2017/0257783 A1* | 9/2017 | Chou | G06F 11/076 |

* cited by examiner

[Fig. 1]
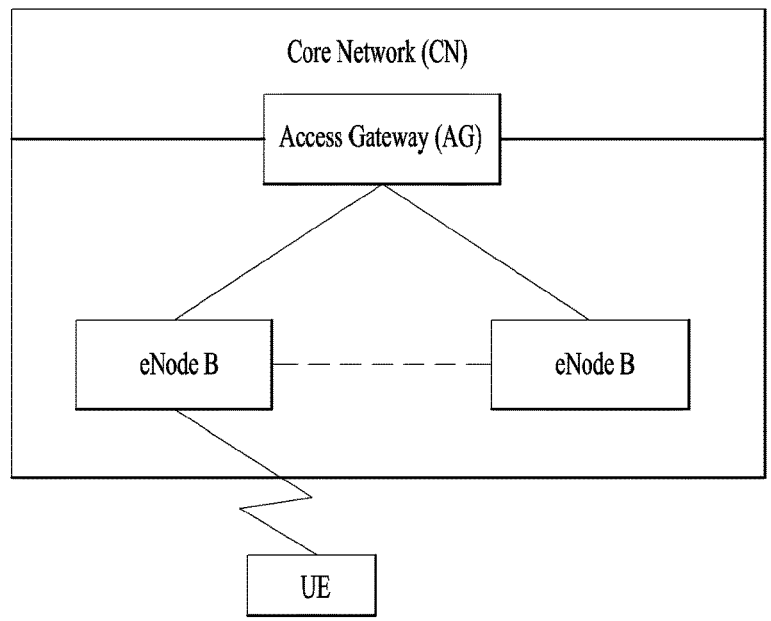
[Fig. 2A]
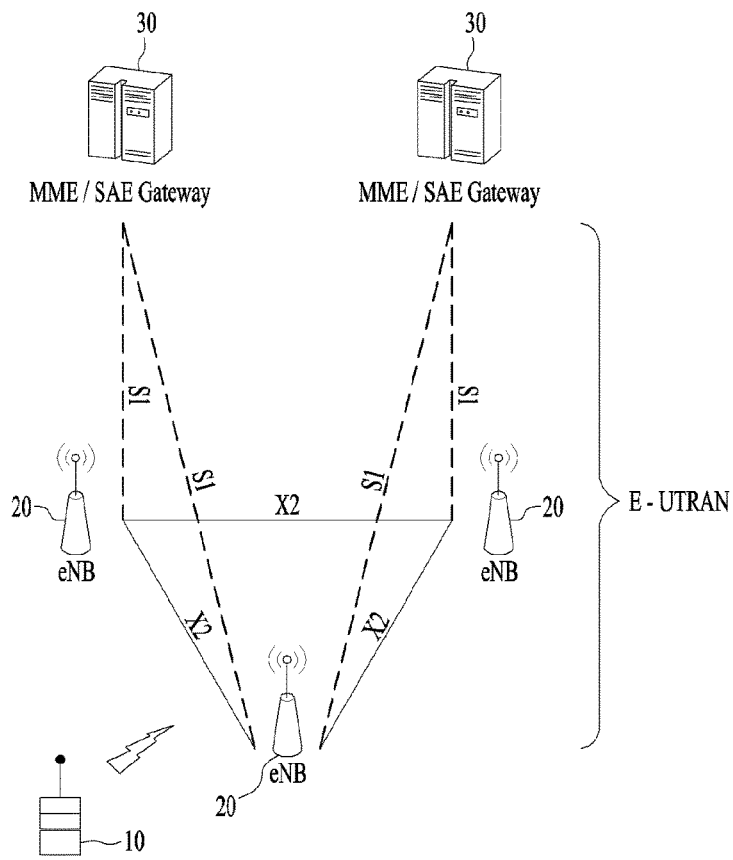

[Fig. 2B]
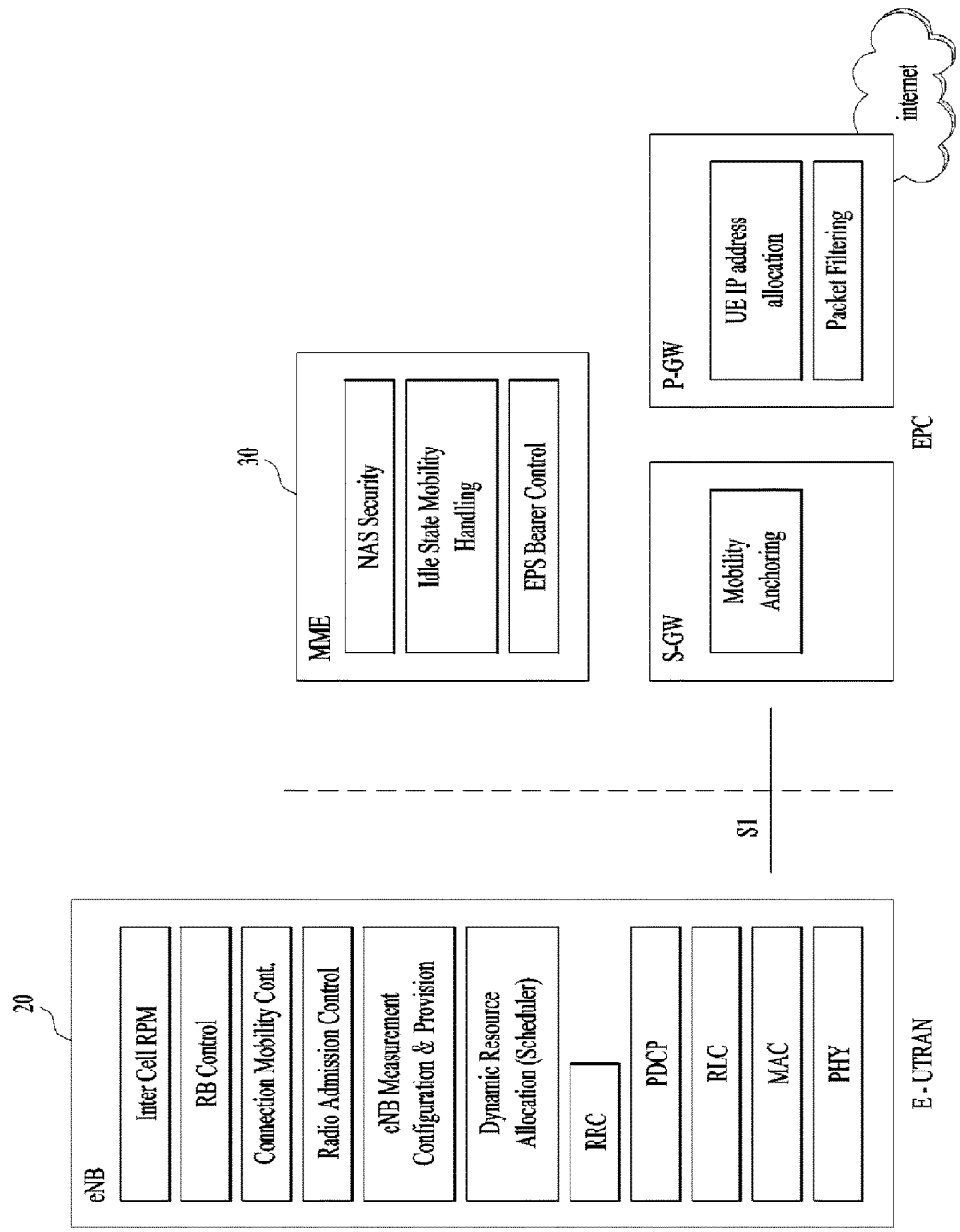

[Fig. 3]
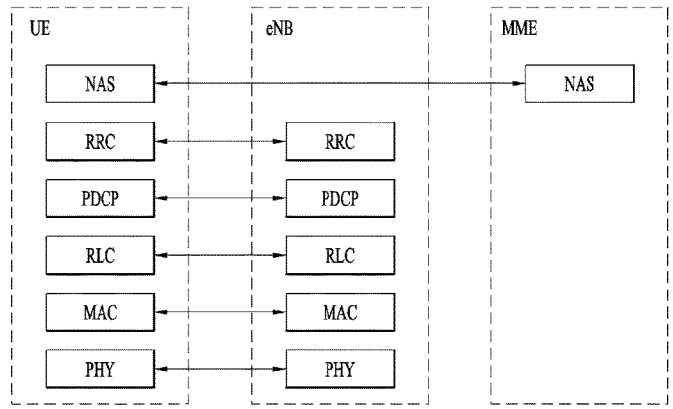
(a) Control-Plane Protocol Stack
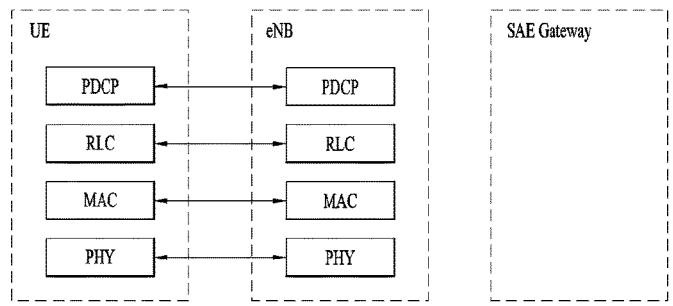
(b) User-Plane Protocol Stack
[Fig. 4]
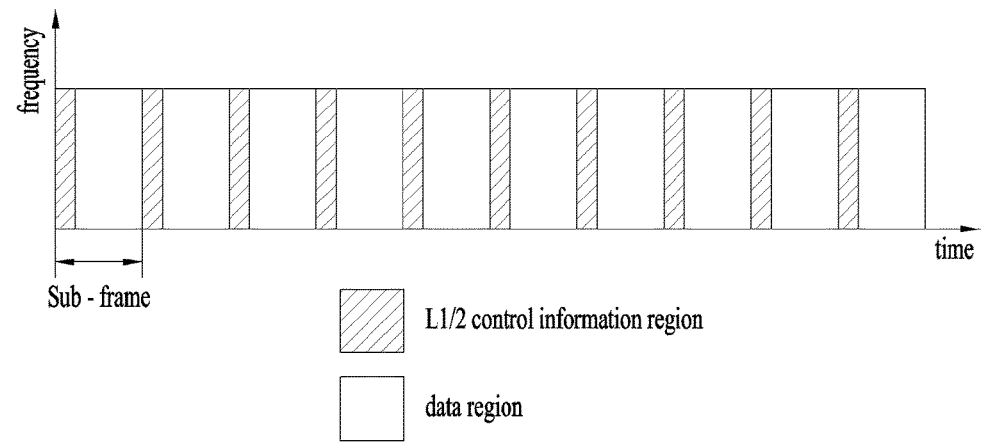

[Fig. 5]
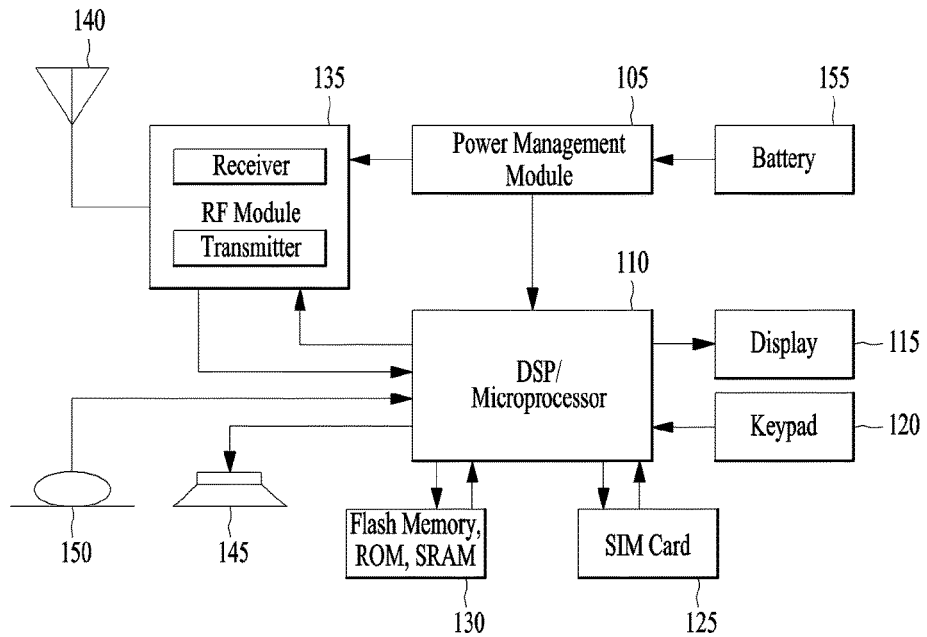
[Fig. 6]
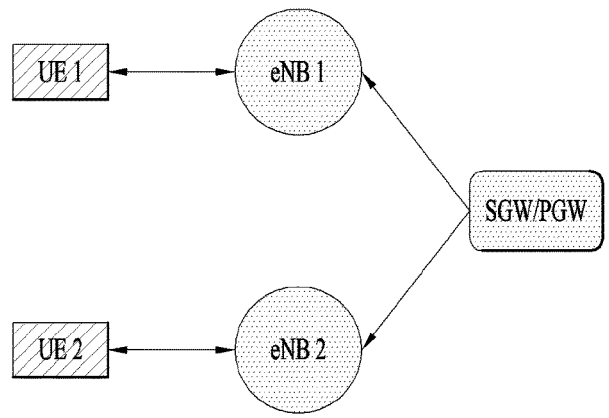
[Fig. 7]
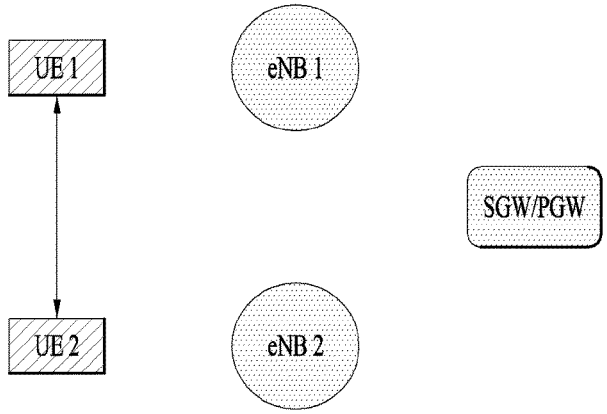

[Fig. 8]
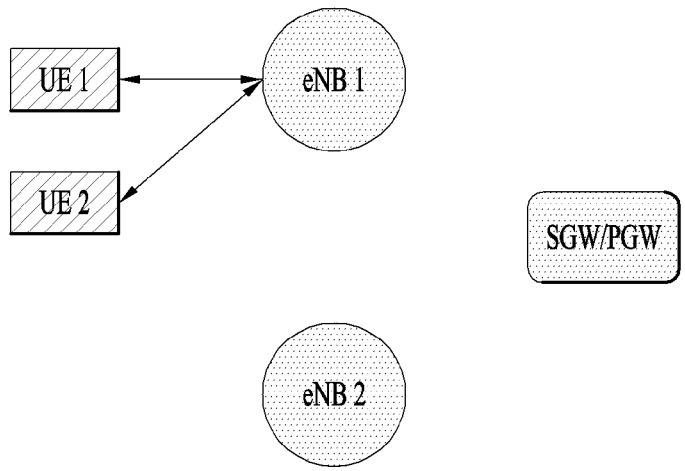
[Fig. 9]
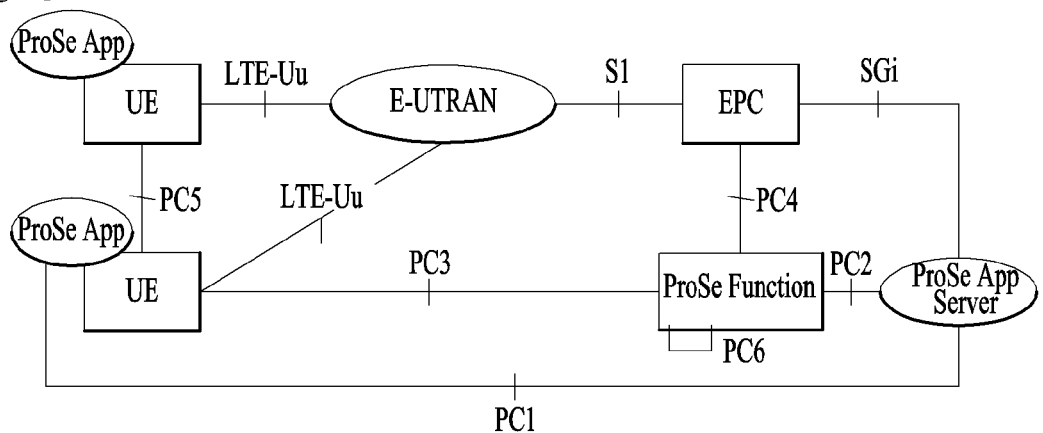

[Fig. 10]
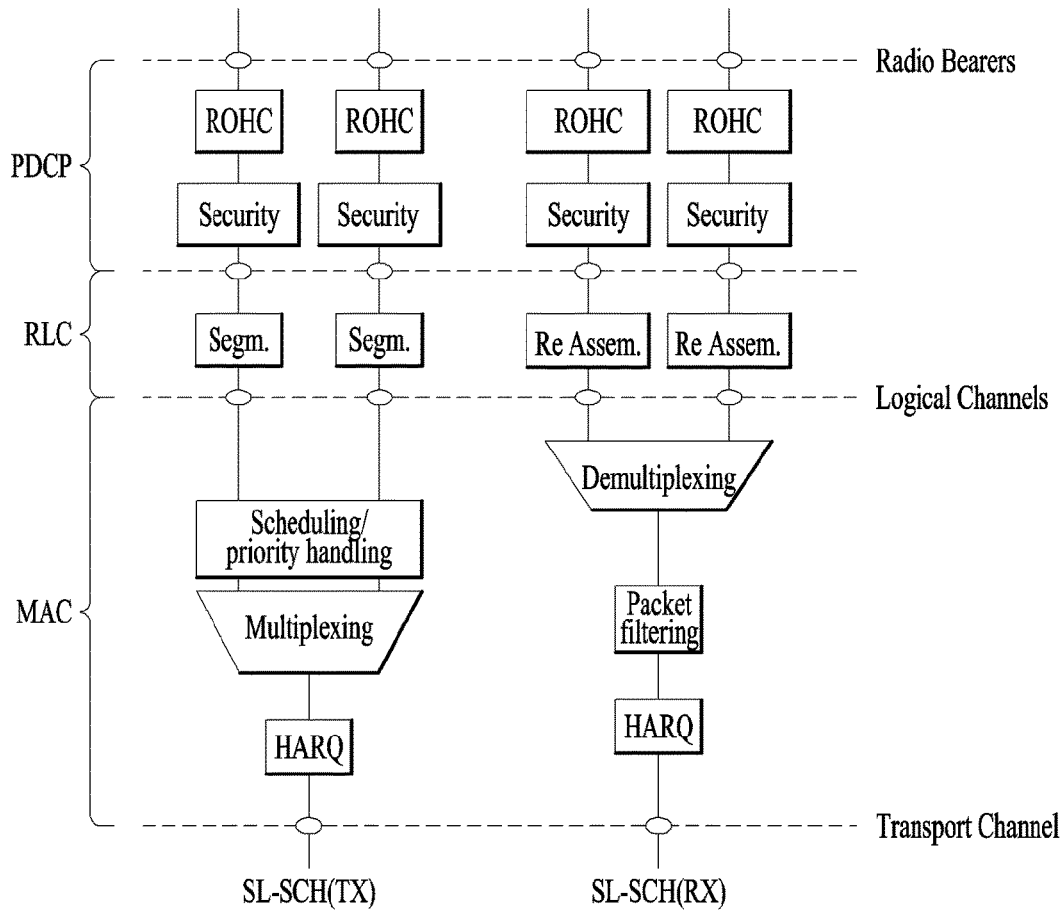
[Fig. 11A]
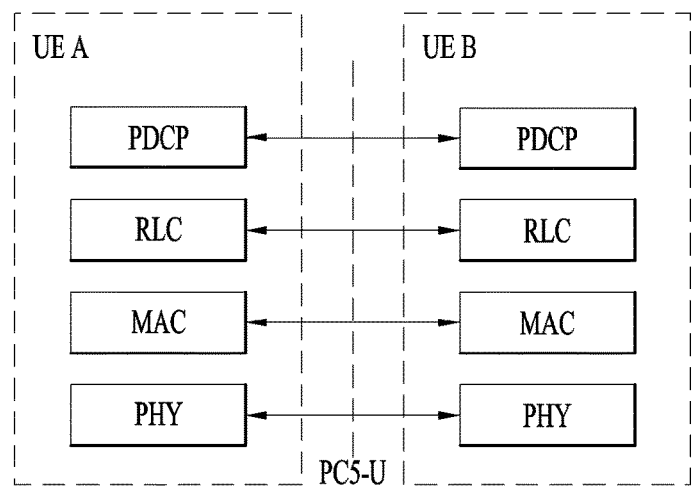

[Fig. 11B]
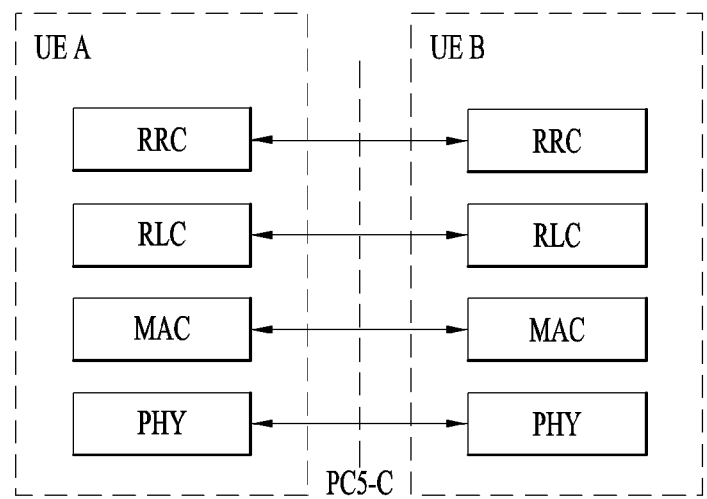
[Fig. 12]
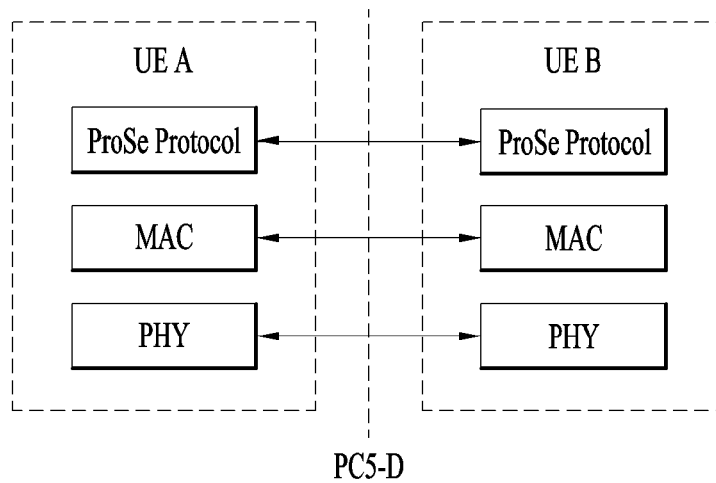

[Fig. 13]
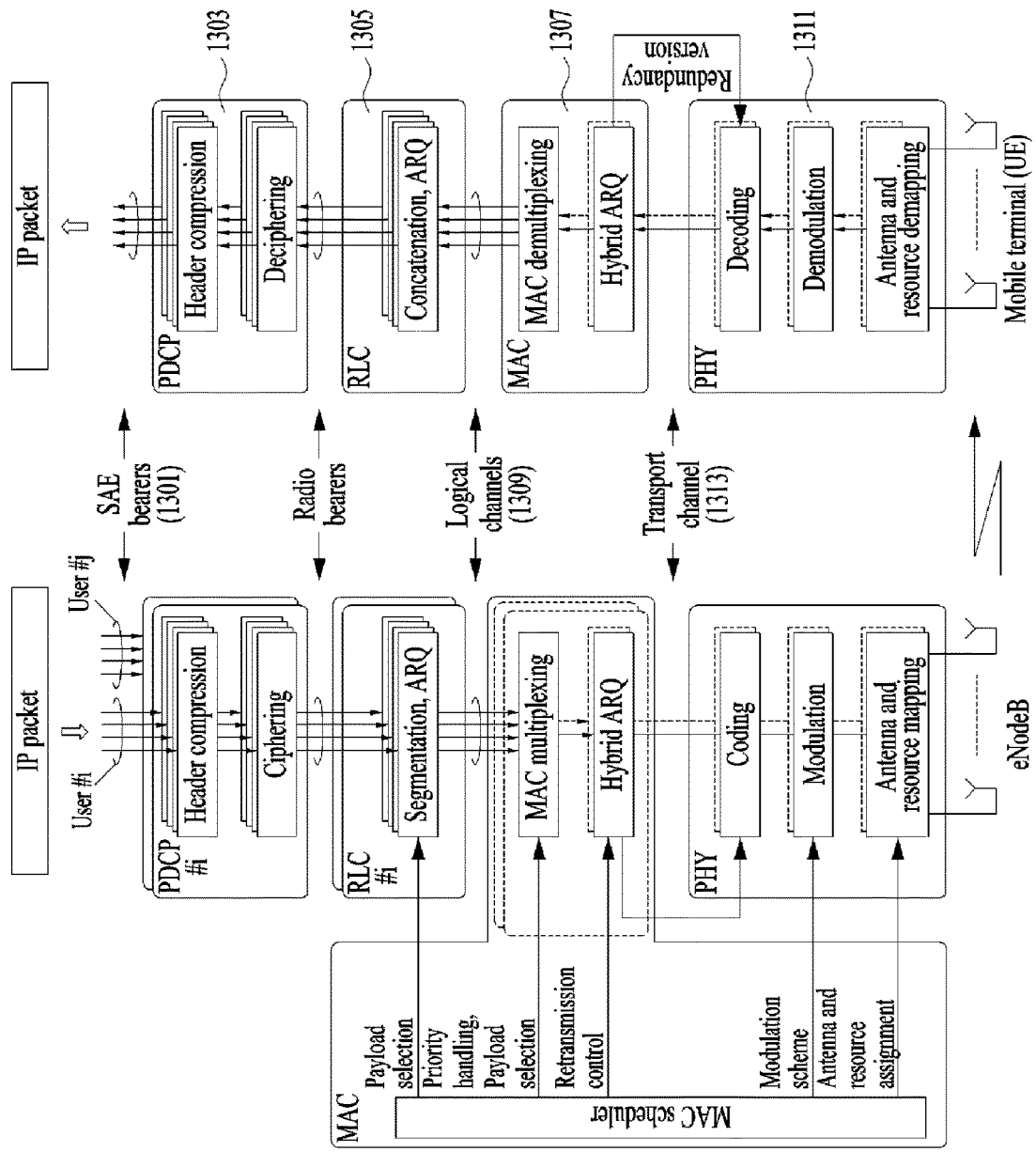

[Fig. 14]
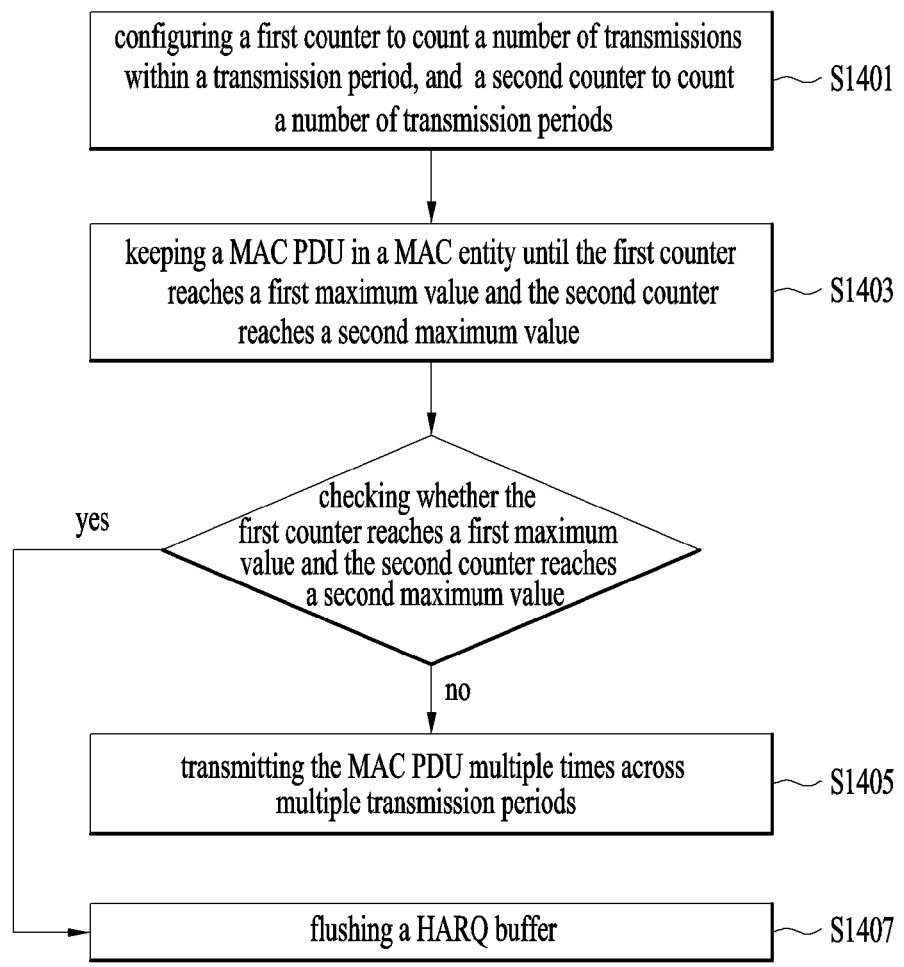

METHOD FOR TRANSMITTING A MAC PDU ON SL-DCH IN A D2D COMMUNICATION SYSTEM AND DEVICE THEREFOR

This application is a 35 USC § 371 National Stage entry of International Application No. PCT/KR2016/000643 filed on Jan. 21, 2016, and claims priority to U.S. Provisional Application No. 62/109,000 filed on Jan. 28, 2015, all of which are hereby incorporated by reference in their entireties as if fully set forth herein.

TECHNICAL FIELD

The present invention relates to a wireless communication system and, more particularly, to a method for transmitting a MAC PDU on SL-DCH (Sidelink discovery channel) in a D2D (Device to Device) communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Device to device (D2D) communication refers to the distributed communication technology that directly transfers traffic between adjacent nodes without using infrastructure such as a base station. In a D2D communication environment, each node such as a portable terminal discovers user equipment physically adjacent thereto and transmits traffic after setting communication session. In this way, since D2D communication may solve traffic overload by distributing traffic concentrated into the base station, the D2D communication may have received attention as the element technology of the next generation mobile communication technology after 4G. For this reason, the standard institute such as 3GPP or IEEE has proceeded to establish the D2D communication standard on the basis of LTE-A or Wi-Fi, and Qualcomm has developed their own D2D communication technology.

It is expected that the D2D communication contributes to increase throughput of a mobile communication system and create new communication services. Also, the D2D communication may support proximity based social network services or network game services. The problem of link of a user equipment located at a shade zone may be solved by using a D2D link as a relay. In this way, it is expected that the D2D technology will provide new services in various fields.

The D2D communication technologies such as infrared communication, ZigBee, radio frequency identification (RFID) and near field communications (NFC) based on the RFID have been already used. However, since these technologies support communication only of a specific object within a limited distance (about 1 m), it is difficult for the technologies to be regarded as the D2D communication technologies strictly.

Although the D2D communication has been described as above, details of a method for transmitting data from a plurality of D2D user equipments with the same resource have not been suggested.

DISCLOSURE OF INVENTION

Technical Problem

An object of the present invention devised to solve the problem lies in a method and device for a method for transmitting a MAC PDU on SL-DCH in a D2D communication system. The technical problems solved by the present invention are not limited to the above technical problems and those skilled in the art may understand other technical problems from the following description.

Solution to Problem

The object of the present invention can be achieved by providing a method for operating by an apparatus in wireless communication system, the method comprising; configuring a first counter to count a number of transmissions within a transmission period; configuring a second counter to count a number of transmission periods;

keeping a Medium Access Control (MAC) Protocol Data Unit (PDU) in a MAC entity until the first counter reaches a first maximum value and the second counter reaches a second maximum value; and transmitting the MAC PDU.

In another aspect of the present invention provided herein is an UE operating in wireless communication system, the UE comprising: a RF module; and processor configured to control the RF module, wherein the processor is configured to configure a first counter to count a number of transmissions within a transmission period, to configure a second counter to count a number of transmission periods, to keep a Medium Access Control (MAC) Protocol Data Unit (PDU)

in a MAC entity until the first counter reaches a first maximum value and the second counter reaches a second maximum value, and to transmit the MAC PDU.

Preferably, when the first counter reaches the first maximum value and the second counter reaches the second maximum value, the UE flushes a Hybrid-ARQ (HARQ) buffer.

Preferably, the first counter starts from 0 within each transmission period.

Preferably, a value of the first counter is increased by 1 for each transmission within the trasnsmission period.

Preferably, a value of the second counter is increased by 1 for each trasnsmission period.

Preferably, the second counter is set to 0 when the UE first transmits the MAC PDU.

Preferably, the UE keeps the MAC PDU in a HARQ buffer of the MAC entity.

Preferably, the MAC PDU is transmitted multiple times across multiple transmission periods until first counter reaches a first maximum value and the second counter reaches a second maximum value.

It is to be understood that both the foregoing general description and the following detailed description of the present invention are exemplary and explanatory and are intended to provide further explanation of the invention as claimed.

Advantageous Effects of Invention

According to the present invention, transmitting a MAC PDU on SL-DCH can be efficiently performed in a D2D communication system under a certain condition. Specifically, the UE transmits the MAC PDU in a HARQ buffer of the Sidelink process as a new transmission on the first transmission opportunity of each discovery period.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 is a diagram showing a network structure of an Evolved Universal Mobile Telecommunications System (E-UMTS) as an example of a wireless communication system;

FIG. 2A is a block diagram illustrating network structure of an evolved universal mobile telecommunication system (E-UMTS), and FIG. 2B is a block diagram depicting architecture of a typical E-UTRAN and a typical EPC;

FIG. 3 is a diagram showing a control plane and a user plane of a radio interface protocol between a UE and an E-UTRAN based on a 3rd generation partnership project (3GPP) radio access network standard;

FIG. 4 is a diagram of an example physical channel structure used in an E-UMTS system;

FIG. 5 is a block diagram of a communication apparatus according to an embodiment of the present invention FIG. 6 is an example of default data path for a normal communication;

FIGS. 7 and 8 are examples of data path scenarios for a proximity communication;

FIG. 9 is a conceptual diagram illustrating for a non-roaming reference architecture;

FIG. 10 is a conceptual diagram illustrating for a Layer 2 Structure for Sidelink;

FIG. 11A is a conceptual diagram illustrating for User-Plane protocol stack for ProSe Direct Communication, and FIG. 11B is Control-Plane protocol stack for ProSe Direct Communication;

FIG. 12 is a conceptual diagram illustrating for a PC5 interface for ProSe Direct Discovery;

FIG. 13 is a diagram for a general overview of the LTE protocol architecture for the downlink; and FIG. 14 is a diagram for transmitting a MAC PDU on SL-DCH in a D2D communication system according to embodiments of the present invention.

BEST MODE FOR CARRYING OUT THE INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Recently, Proximity-based Service (ProSe) has been discussed in 3GPP. The ProSe enables different UEs to be connected (directly) each other (after appropriate procedure(s), such as authentication), through eNB only (but not further through Serving Gateway (SGW)/Packet Data Network Gateway (PDN-GW, PGW)), or through SGW/PGW. Thus, using the ProSe, device to device direct communication can be provided, and it is expected that every devices will be connected with ubiquitous connectivity. Direct communication between devices in a near distance can lessen the load of network. Recently, proximity-based social network services have come to public attention, and new kinds of proximity-based applications can be emerged and may create new business market and revenue. For the first step, public safety and critical communication are required in the market. Group communication is also one of key components in the public safety system. Required functionalities are: Discovery based on proximity, Direct path communication, and Management of group communications.

Use cases and scenarios are for example: i) Commercial/social use, ii) Network offloading, iii) Public Safety, iv) Integration of current infrastructure services, to assure the consistency of the user experience including reachability and mobility aspects, and v) Public Safety, in case of absence of EUTRAN coverage (subject to regional regulation and operator policy, and limited to specific public-safety designated frequency bands and terminals)

FIG. 6 is an example of default data path for communication between two UEs. With reference to FIG. 6, even when two UEs (e.g., UE1, UE2) in close proximity communicate with each other, their data path (user plane) goes via the operator network. Thus a typical data path for the communication involves eNB(s) and/or Gateway(s) (GW(s)) (e.g., SGW/PGW).

FIGS. 7 and 8 are examples of data path scenarios for a proximity communication. If wireless devices (e.g., UE1, UE2) are in proximity of each other, they may be able to use a direct mode data path (FIG. 7) or a locally routed data path (FIG. 8). In the direct mode data path, wireless devices are connected directly each other (after appropriate procedure(s), such as authentication), without eNB and SGW/PGW. In the locally routed data path, wireless devices are connected each other through eNB only.

FIG. 9 is a conceptual diagram illustrating for a non-roaming reference architecture.

PC1 to PC 5 represent interfaces. PC1 is a reference point between a ProSe application in a UE and a ProSe App server. It is used to define application level signaling requirements. PC 2 is a reference point between the ProSe App Server and the ProSe Function. It is used to define the interaction between ProSe App Server and ProSe functionality provided by the 3GPP EPS via ProSe Function. One example may be for application data updates for a ProSe database in the ProSe Function. Another example may be data for use by ProSe App Server in interworking between 3GPP functionality and application data, e.g. name translation. PC3 is a reference point between the UE and ProSe Function. It is used to define the interaction between UE and ProSe Function. An example may be to use for configuration for ProSe discovery and communication. PC4 is a reference point between the EPC and ProSe Function. It is used to define the interaction between EPC and ProSe Function. Possible use cases may be when setting up a one-to-one communication path between UEs or when validating ProSe services (authorization) for session management or mobility management in real time.

PC5 is a reference point between UE to UE used for control and user plane for discovery and communication, for relay and one-to-one communication (between UEs directly and between UEs over LTE-Uu). Lastly, PC6 is a reference point may be used for functions such as ProSe Discovery between users subscribed to different PLMNs.

EPC (Evolved Packet Core) includes entities such as MME, S-GW, P-GW, PCRF, HSS etc. The EPC here represents the E-UTRAN Core Network architecture. Interfaces inside the EPC may also be impacted albeit they are not explicitly shown in FIG. 9.

Application servers, which are users of the ProSe capability for building the application functionality, e.g. in the Public Safety cases they can be specific agencies (PSAP) or in the commercial cases social media. These applications are defined outside the 3GPP architecture but there may be reference points towards 3GPP entities. The Application server can communicate towards an application in the UE.

Applications in the UE use the ProSe capability for building the application functionality. Example may be for communication between members of Public Safety groups or for social media application that requests to find buddies in proximity. The ProSe Function in the network (as part of EPS) defined by 3GPP has a reference point towards the ProSe App Server, towards the EPC and the UE.

The functionality may include but not restricted to e.g.:
Interworking via a reference point towards the 3rd party Applications
Authorization and configuration of the UE for discovery and Direct communication
Enable the functionality of the EPC level ProSe discovery
ProSe related new subscriber data and/handling of data storage; also handling of ProSe identities;
Security related functionality
Provide Control towards the EPC for policy related functionality
Provide functionality for charging (via or outside of EPC, e.g. offline charging)

Especially, the following identities are used for ProSe Direct Communication:
Source Layer-2 ID identifies a sender of a D2D packet at PC5 interface. The Source Layer-2 ID is used for identification of the receiver RLC UM entity;
Destination Layer-2 ID identifies a target of the D2D packet at PC5 interface. The Destination Layer-2 ID is used for filtering of packets at the MAC layer. The Destination Layer-2 ID may be a broadcast, groupcast or unicast identifier; and
SA L1 ID identifier in Scheduling Assignment (SA) at PC5 interface. SA L1 ID is used for filtering of packets at the physical layer. The SA L1 ID may be a broadcast, groupcast or unicast identifier.

No Access Stratum signaling is required for group formation and to configure Source Layer-2 ID and Destination Layer-2 ID in the UE. This information is provided by higher layers.

In case of groupcast and unicast, the MAC layer will convert the higher layer ProSe ID (i.e. ProSe Layer-2 Group ID and ProSe UE ID) identifying the target (Group, UE) into two bit strings of which one can be forwarded to the physical layer and used as SA L1 ID whereas the other is used as Destination Layer-2 ID. For broadcast, L2 indicates to L1 that it is a broadcast transmission using a pre-defined SA L1 ID in the same format as for group- and unicast.

FIG. 10 is a conceptual diagram illustrating for a Layer 2 structure for Sidelink.

The Sidelink is UE to UE interface for ProSe direct communication and ProSe Direct Discovery. Corresponds to the PC5 interface. The Sidelink comprises ProSe Direct Discovery and ProSe Direct Communication between UEs. The Sidelink uses uplink resources and physical channel structure similar to uplink transmissions. However, some changes, noted below, are made to the physical channels. E-UTRA defines two MAC entities; one in the UE and one in the E-UTRAN. These MAC entities handle the following transport channels additionally, i) sidelink broadcast channel (SL-BCH), ii) sidelink discovery channel (SL-DCH) and iii) sidelink shared channel (SL-SCH).

Basic transmission scheme: the Sidelink transmission uses the same basic transmission scheme as the UL transmission scheme. However, sidelink is limited to single cluster transmissions for all the sidelink physical channels. Further, sidelink uses a 1 symbol gap at the end of each sidelink sub-frame.

Physical-layer processing: the Sidelink physical layer processing of transport channels differs from UL transmission in the following steps:
i) Scrambling: for PSDCH and PSCCH, the scrambling is not UE-specific;
ii) Modulation: 64 QAM is not supported for Sidelink
Physical Sidelink control channel: PSCCH is mapped to the Sidelink control resources. PSCCH indicates resource and other transmission parameters used by a UE for PSSCH.
Sidelink reference signals: for PSDCH, PSCCH and PSSCH demodulation, reference signals similar to uplink demodulation reference signals are transmitted in the 4th symbol of the slot in normal CP and in the 3rd symbol of the slot in extended cyclic prefix. The Sidelink demodulation reference signals sequence length equals the size (number of sub-carriers) of the assigned resource. For PSDCH and PSCCH, reference signals are created based on a fixed base sequence, cyclic shift and orthogonal cover code.
Physical channel procedure: for in-coverage operation, the power spectral density of the sidelink transmissions can be influenced by the eNB.

FIG. 11A is a conceptual diagram illustrating for User-Plane protocol stack for ProSe Direct Communication, and FIG. 11B is Control-Plane protocol stack for ProSe Direct Communication.

FIG. 11A shows the protocol stack for the user plane, where PDCP, RLC and MAC sublayers (terminate at the other UE) perform the functions listed for the user plane (e.g. header compression, HARQ retransmissions). The PC5 interface consists of PDCP, RLC, MAC and PHY as shown in FIG. 11A.

User plane details of ProSe Direct Communication: i) There is no HARQ feedback for ProSe Direct Communication, ii) RLC UM is used for ProSe Direct Communication, iii) A receiving UE needs to maintain at least one RLC UM entity per transmitting peer UE; iv) A receiving ProSe-RLC UM entity used for ProSe Direct Communication does not need to be configured prior to reception of the first RLC UMD PDU; v) ROHC Unidirectional-Mode is used for header compression in PDCP for ProSe Direct Communication.

A UE may establish multiple logical channels. LCID included within the MAC subheader uniquely identifies a logical channel within the scope of one Source Layer-2 ID and ProSe Layer-2 Group ID combination. Parameters for logical channel prioritization are not configured.

FIG. 11B shows the protocol stack for the control plane.

A UE does not establish and maintain a logical connection to receiving UEs prior to a ProSe Direct Communication.

In order to perform synchronization UE(s) may transmit synchronisation signal and SBCCH and become synchronization source. The Access Stratum protocol stack for SBCCH in the PC5 interface consists of RRC, RLC, MAC and PHY as shown FIG. 11B.

The UE supporting ProSe Direct Communication can operate in two modes for resource allocation:

Mode 1 is a Scheduled resource allocation. In this case, the UE needs to be RRC_CONNECTED in order to transmit data. The UE requests transmission resources from the eNB. The eNB schedules transmission resources for transmission of Sidelink Control and data. The UE sends a scheduling request (D-SR or Random Access) to the eNB followed by a ProSe BSR. Based on the ProSe BSR the eNB can determine that the UE has data for a ProSe Direct Communication transmission and estimate the resources needed for transmission. eNB can schedule transmission resources for ProSe Direct Communication using configured SL-RNTI.

Mode 2 is an autonomous resource selection. In this case, a UE on its own selects resources from resource pools to transmit Sidelink Control and data. A UE in RRC_CONNECTED may send the ProSe Direct indication to eNB when UE becomes interested in ProSe Direct Communication. In response eNB may configure the UE with a SL-RNTI. A UE is considered in-coverage for ProSe Direct Communication whenever it detects a cell on a Public Safety ProSe Carrier as per criteria.

The resource pools for Sidelink Control when the UE is out of coverage are configured as below: i) the resource pool used for reception is pre-configured; or ii) the resource pool used for transmission is pre-configured.

The resource pools for Sidelink Control when the UE is in coverage are configured as below: i) the resource pool used for reception is configured by the eNB via RRC, in broadcast signalling; or ii) the resource pool used for transmission is configured by the eNB via RRC, in dedicated or broadcast signalling, if UE autonomous resource selection is used; or iii) the resource pool used for transmission is configured by the eNB via RRC, in dedicated signalling if scheduled resource allocation is used. The eNB schedules the specific resource(s) for Sidelink Control transmission within the configured reception pool.

The resource pools for data when the UE is out of coverage are configured as below: i) the resource pool used for reception is pre-configured; and ii) the resource pool used for transmission is pre-configured.

The resource pools for data when the UE is in coverage are configured as below: i) the resource pools used for transmission and reception are configured by the eNB via RRC, in dedicated or broadcast signalling, if UE autonomous resource selection is used; ii) there is no resource pool for transmission if scheduled resource allocation is used.

FIG. 12 is a conceptual diagram illustrating for a PC5 interface for ProSe Direct Discovery.

ProSe Direct Discovery is defined as the procedure used by the UE supporting Direct Discovery to discover other UE(s) in its proximity, using E-UTRA direct radio signals via PC5. ProSe Direct Discovery is supported only when the UE is served by E-UTRAN.

The UE can participate in announcing and monitoring of discovery message in both RRC_IDLE and RRC_CONNECTED states as per eNB configuration. The UE announces and monitors its discovery message subject to the half-duplex constraint.

The UE that participates in announcing and monitoring of discovery messages maintains the current UTC time. The UE that participates in announcing transmits the discovery message which is generated by the ProSe Protocol taking into account the UTC time upon transmission of the discovery message. In the monitoring UE the ProSe Protocol provides the message to be verified together with the UTC time upon reception of the message to the ProSe Function.

Radio Protocol Stack (AS) for ProSe Direct Discovery consists of only MAC and PHY.

The AS layer performs the following functions: i) Interfaces with upper layer (ProSe Protocol): The MAC layer receives the discovery message from the upper layer (ProSe Protocol). The IP layer is not used for transmitting the discovery message, ii) Scheduling: The MAC layer determines the radio resource to be used for announcing the discovery message received from upper layer, iii) Discovery PDU generation: The MAC layer builds the MAC PDU carrying the discovery message and sends the MAC PDU to the physical layer for transmission in the determined radio resource. No MAC header is added.

In case of UE autonomous resource selection, the eNB provides the UE(s) with the resource pool configuration used for announcing of discovery message. The configuration may be signalled in broadcast or dedicated signaling. The UE autonomously selects radio resource(s) from the indicated resource pool and announces discovery message, and the UE can announce discovery message on a randomly selected discovery resource during each discovery period.

Meanwhile, in case of Scheduled resource allocation, the UE in RRC_CONNECTED may request resource(s) for announcing of discovery message from the eNB via RRC. The eNB assigns resource(s) via RRC, and the resources are allocated within the resource pool that is configured in UEs for monitoring.

For UEs in RRC_IDLE, the eNB may select one of the following options: i) The eNB may provide a resource pool for UE autonomous resource selection based discovery message announcement in SIB 19. UEs that are authorized for Prose Direct Discovery use these resources for announcing discovery message in RRC_IDLE, ii) The eNB may indicate in SIB 19 that it supports ProSe Direct Discovery but does not provide resources for discovery message announcement. UEs need to enter RRC_CONNECTED in order to request resources for discovery message announcement.

For UEs in RRC_CONNECTED, A UE authorized to perform ProSe Direct Discovery announcement indicates to the eNB that it wants to perform ProSe Direct Discovery announcement. The eNB validates whether the UE is authorized for ProSe Direct Discovery announcement using the UE context received from MME. The eNB may configure the UE with resource pool for UE autonomous resource selection for discovery message announcement via dedicated signaling. The eNB may configure resource pool along with dedicated resource in the form of time and frequency indices for discovery message announcement via dedicated RRC signaling. The dedicated resources allocated by the eNB are valid until the eNB re-configures the resource(s) by RRC signaling or, the UE enters RRC_IDLE.

Authorized receiving UEs in RRC_IDLE and RRC_CONNECTED monitor resource pools used for UE autonomous resource selection and resource pools for scheduled resource allocation. The eNB provides the resource pool configuration used for discovery message monitoring in SIB 19. The SIB 19 may contain detailed ProSe Direct Discovery configuration used for announcing in neighbour cells of intra-frequency as well.

Synchronous and asynchronous deployments are supported. Discovery resources can be overlapping or non-overlapping across cells A UE if authorized by the NW can announce discovery message only on serving cell. The UE can monitor discovery resources in the same as well as other frequencies than the serving cell, in same or different PLMNs.

FIG. 13 is a diagram for a general overview of the LTE protocol architecture for the downlink.

A general overview of the LTE protocol architecture for the downlink is illustrated in FIG. 13. Furthermore, the LTE protocol structure related to uplink transmissions is similar to the downlink structure in FIG. 13, although there are differences with respect to transport format selection and multi-antenna transmission.

Data to be transmitted in the downlink enters in the form of IP packets on one of the SAE bearers (1301). Prior to transmission over the radio interface, incoming IP packets are passed through multiple protocol entities, summarized below and described in more detail in the following sections:

Packet Data Convergence Protocol (PDCP, 1303) performs IP header compression to reduce the number of bits necessary to transmit over the radio interface. The header-compression mechanism is based on ROHC, a standardized header-compression algorithm used in WCDMA as well as several other mobile-communication standards. PDCP (1303) is also responsible for ciphering and integrity protection of the transmitted data. At the receiver side, the PDCP protocol performs the corresponding deciphering and decompression operations. There is one PDCP entity per radio bearer configured for a mobile terminal.

Radio Link Control (RLC, 1305) is responsible for segmentation/concatenation, retransmission handling, and in-sequence delivery to higher layers. Unlike WCDMA, the RLC protocol is located in the eNodeB since there is only a single type of node in the LTE radio-access-network architecture. The RLC (1305) offers services to the PDCP (1303) in the form of radio bearers. There is one RLC entity per radio bearer configured for a terminal.

There is one RLC entity per logical channel configured for a terminal, where each RLC entity is responsible for: i) segmentation, concatenation, and reassembly of RLC SDUs; ii) RLC retransmission; and iii) in-sequence delivery and duplicate detection for the corresponding logical channel.

Other noteworthy features of the RLC are: (1) the handling of varying PDU sizes; and (2) the possibility for close interaction between the hybrid-ARQ and RLC protocols. Finally, the fact that there is one RLC entity per logical channel and one hybrid-ARQ entity per component carrier implies that one RLC entity may interact with multiple hybrid-ARQ entities in the case of carrier aggregation.

The purpose of the segmentation and concatenation mechanism is to generate RLC PDUs of appropriate size from the incoming RLC SDUs. One possibility would be to define a fixed PDU size, a size that would result in a compromise. If the size were too large, it would not be possible to support the lowest data rates. Also, excessive padding would be required in some scenarios. A single small PDU size, however, would result in a high overhead from the header included with each PDU. To avoid these drawbacks, which is especially important given the very large dynamic range of data rates supported by LTE, the RLC PDU size varies dynamically.

In process of segmentation and concatenation of RLC SDUs into RLC PDUs, a header includes, among other fields, a sequence number, which is used by the reordering and retransmission mechanisms. The reassembly function at the receiver side performs the reverse operation to reassemble the SDUs from the received PDUs.

Medium Access Control (MAC, 1307) handles hybrid-ARQ retransmissions and uplink and downlink scheduling. The scheduling functionality is located in the eNodeB, which has one MAC entity per cell, for both uplink and downlink. The hybrid-ARQ protocol part is present in both the transmitting and receiving end of the MAC protocol. The MAC (1307) offers services to the RLC (1305) in the form of logical channels (1309).

Physical Layer (PHY, 1311), handles coding/decoding, modulation/demodulation, multi-antenna mapping, and other typical physical layer functions. The physical layer (1311) offers services to the MAC layer (1307) in the form of transport channels (1313).

The physical layer offers information transfer services to MAC and higher layers. The physical layer transport services are described by how and with what characteristics data are transferred over the radio interface. An adequate term for this is "Transport Channel".

Downlink Transport Channel Types are:
1. Broadcast Channel (BCH) characterized by, i) fixed, pre-defined transport format, ii) requirement to be broadcast in the entire coverage area of the cell.
2. Downlink Shared Channel (DL-SCH) characterized by, i) support for HARQ, ii) support for dynamic link adaptation by varying the modulation, coding and transmit power, iii) possibility to be broadcast in the entire cell, iv) possibility to use beamforming, v) support for both dynamic and semi-static resource allocation, vi) support for UE discontinuous reception (DRX) to enable UE power saving.
3. Paging Channel (PCH) characterized by, i) support for UE discontinuous reception (DRX) to enable UE power saving (DRX cycle is indicated by the network to the UE), ii) requirement to be broadcast in the entire coverage area of the cell, iii) mapped to physical resources which can be used dynamically also for traffic/other control channels.
4. Multicast Channel (MCH) characterized by, i) requirement to be broadcast in the entire coverage area of the cell, ii) support for MBSFN combining of MBMS transmission on multiple cells, iii) support for semi-static resource allocation e.g. with a time frame of a long cyclic prefix.

Uplink Transport Channel Types are:
1. Uplink Shared Channel (UL-SCH) characterized by, i) possibility to use beamforming, ii) support for dynamic link adaptation by varying the transmit power and potentially modulation and coding, iii) support for HARQ, iv) support for both dynamic and semi-static resource allocation.
2. Random Access Channel(s) (RACH) characterized by, i) limited control information, ii) collision risk.

Sidelink Transport Channel Types are:
1. Sidelink broadcast channel (SL-BCH) characterized by pre-defined transport format.
2. Sidelink discovery channel (SL-DCH) characterized by, i) fixed size, pre-defined format periodic broadcast transmission, ii) support for both UE autonomous resource selection and scheduled resource allocation by eNB, iii) collision risk due to support of UE autonomous resource selection; no collision when UE is allocated dedicated resources by the eNB.

3. Sidelink shared channel (SL-SCH) characterized by, i) support for broadcast transmission, ii) support for both UE autonomous resource selection and scheduled resource allocation by eNB, iii) collision risk due to support of UE autonomous resource selection; no collision when UE is allocated dedicated resources by the eNB, iv) support for HARQ combining, but no support for HARQ feedback, v) support for dynamic link adaptation by varying the transmit power, modulation and coding.

SL-SCH Data Transmission

In order to transmit on the SL-SCH the UE must have a sidelink grant. The sidelink grant is selected as follows:

i) If the UE receives a sidelink grant dynamically on the PDCCH or EPDCCH, the UE shall use the received sidelink grant determine the set of subframes in which transmission of sidelink control information and transmission of first transport block occur, consider the received sidelink grant to be a configured sidelink grant occurring in those subframes starting at the beginning of the first available SC Period which starts at least 4 subframes after the subframe in which the sidelink grant was received, overwriting a previously configured sidelink grant occurring in the same SC period, if available, and clear the configured sidelink grant at the end of the corresponding SC Period.

ii) If the UE is configured by upper layers to transmit using a pool of resources as indicated and data is available in STCH and if the UE does not have a configured sidelink grant, the UE shall randomly select a sidelink grant from the resource pool configured by upper layers. The random function shall be such that each of the allowed selections can be chosen with equal probability, use the selected sidelink grant determine the set of subframes in which transmission of sidelink control information and transmission of first transport block occur, consider the received sidelink grant to be a configured sidelink grant occurring in those subframes starting at the beginning of the first available SC Period which starts at least 4 subframes after the subframe in which the sidelink grant was received, and clear the configured sidelink grant at the end of the corresponding SC Period.

If the UE has a configured sidelink grant occurring in this subframe, for each subframe, the UE shall instruct the physical layer to transmit a scheduling assignment corresponding to the configured sidelink grant if the configured sidelink grant corresponds to transmission of sidelink control information. Else if the configured sidelink grant corresponds to transmission of first transport block, the UE shall deliver the configured sidelink grant and the associated HARQ information to the Sidelink HARQ Entity for this subframe.

SL-SCH Data Reception

Scheduling assignments transmitted on the PSCCH indicate if there is a transmission on SL-SCH and provide the relevant HARQ information.

For each subframe during which the UE monitors PSCCH, the UE shall store the scheduling assignment and associated HARQ information as scheduling assignment valid for the subframes corresponding to first transmission of each transport block if a scheduling assignment for this subframe has been received on the PSCCH for a Sidelink Scheduling Assignment Identity of interest to this UE.

For each subframe for which the UE has a valid scheduling assignment, the UE shall deliver the scheduling assignment and the associated HARQ information to the Sidelink HARQ Entity.

In the previous art, for ProSe discovery purpose, the UE receives the grant or selects the grant by itself in order to transmit a MAC PDU in a discovery period. In order to transmit in another discovery period, the UE needs to receive the grant or selects the grant again for that discover period. Within a discovery period, after retransmitting the MAC PDU up to the maxRetx by using the grant, the Sidelink HARQ buffer is flushed. Consequently, it is not possible to transmit a MAC PDU once received from the upper layer across multiple discovery periods, which could be assumed for e.g., a discovery announcement message.

Therefore, a new mechanism is needed which enables the followings:

The UE generates a configured grant for the consecutive discovery periods in advance.

The UE keeps the MAC PDU in a HARQ buffer and maintains the Sidelink process for that MAC PDU even though the HARQ transmissions in a discovery period end.

The UE transmits the MAC PDU in a HARQ buffer of the Sidelink process as a new transmission on the first transmission opportunity of each discovery period. FIG. 14 is a diagram for transmitting a MAC PDU on SL-DCH in a D2D communication system according to embodiments of the present invention.

In this invention, the UE transmits the MAC PDU in a HARQ buffer of the Sidelink process as a new transmission on the first transmission opportunity of each discovery period.

The UE configures a first counter to count a number of transmissions within a transmission period, and a second counter to count a number of transmission periods (S1401).

Preferably, the first counter is a state variable 'CURRENT_TX_NB', which indicates the number of transmissions that have taken place for the MAC PDU in a discovery period currently in the buffer, and starts from 0 within each transmission period.

Preferably, a value of the first counter is increased by 1 for each transmission within the trasnsmission period.

Preferably, the second counter is a state variable 'CURRENT_NWTX_NB', which indicates the number of new transmissions that have take place for the MAC PDU.

If the Sidelink HARQ Entity delivers a configured grant and a MAC PDU to the Sidelink HARQ Entity, the Sidelink process shall set CURRENT_NWTX_NB to 0. And if the Sidelink HARQ Entity requests a new transmission, the UE increments CURRENT_NWTX_NB by 1.

The UE keeps a MAC PDU in a MAC entity until the first counter reaches a first maximum value and the second counter reaches a second maximum value (S1403).

Preferably, the UE keeps the MAC PDU in a HARQ buffer of the MAC entity.

The UE transmits the MAC PDU multiple times across multiple transmission periods until first counter reaches a first maximum value and the second counter reaches a second maximum value (S1405).

When the first counter reaches the first maximum value and the second counter reaches the second maximum value, the UE flushes a Hybrid-ARQ (HARQ) buffer (S1407).

In conclusion, in order to transmit a MAC PDU on SL-DCH, when the MAC PDU is received from the upper layer, the UE shall, using the grant, select the resource to be used in the discovery period which starts at least 4 subframes after the subframe in which the resource is selected and in the discovery periods following that discovery period, and deliver that resource to be used as configured grant and the MAC PDU to the Sidelink HARQ Entity if the UE is configured by upper layers with a specific grant.

Else if the UE is configured with a single pool of resources configured by upper layers, the UE shall select a random resource from the pool of resources (excluding any resources which are overlapping with PRACH), where the random function shall be such that each of the allowed selections can be chosen with equal probability for the discovery period which starts at least 4 subframes after the subframe in which the resource is selected and the discovery periods following that discovery period, and deliver the MAC PDU and that resource to be used as a configured grant to the Sidelink HARQ Entity.

There is one Sidelink HARQ Entity at the UE for transmission on SL-DCH, which maintains one Sidelink process for each MAC PDU.

For each subframe of the SL-DCH the Sidelink HARQ Entity shall deliver the MAC PDU and the configured grant to the Sidelink process if a configured grant and a MAC PDU has been delivered for this subframe to the Sidelink HARQ Entity.

If a configured grant and a MAC PDU has been delivered for this subframe to the Sidelink HARQ Entity; or, if this subframe corresponds to new transmission opportunity according to the configured grant for this Sidelink process, the UE shall instruct the Sidelink process to trigger a new transmission.

Else if this subframe corresponds to retransmission opportunity according to the configured grant for the Sidelink process, the UE shall instruct the Sidelink process to trigger a retransmission.

The Sidelink process is associated with a HARQ buffer.

The Sidelink process shall maintain a state variable CURRENT_TX_NB, which indicates the number of transmissions that have taken place for the MAC PDU in a discovery period currently in the buffer, and a state variable CURRENT_NWTX_NB, which indicates the number of new transmissions that have take place for the MAC PDU. When the Sidelink process is established, CURRENT_TX_NB and CURRENT_NWTX_NB shall be initialized to 0. The sequence of redundancy versions is 0, 2, 3, 1. The variable CURRENT_IRV is an index into the sequence of redundancy versions. This variable is up-dated modulo 4.

The Sidelink process is configured with a maximum number of HARQ transmissions in a discovery period by RRC: 'numRetx'. The Sidelink process is configured with a maximum number of new transmissions of a MAC PDU by RRC: 'numNewtx'.

If the Sidelink HARQ Entity delivers a configured grant and a MAC PDU to the Sidelink HARQ Entity, the Sidelink process shall set CURRENT_NWTX_NB to 0.

If the Sidelink HARQ Entity requests a new transmission, the Sidelink process shall set CURRENT_TX_NB to 0, increment CURRENT_NWTX_NB by 1, set CURRENT_IRV to 0, store the MAC PDU, if the MAC PDU is received from Sidelink HARQ Entity, in the associated HARQ buffer, store the configured grant, if the configured grant is received from the Sidelink HARQ Entity. And also the UE shall generate a transmission if the UE is configured by upper layers with a specific grant.

Else if the UE is configured with a single pool of resources configured by upper layers, the UE shall select a random value p1, where the random function shall be such that each of the allowed selections can be chosen with equal probability.

If the Sidelink HARQ Entity requests a retransmission, the Sidelink process shall generate a transmission if a new transmission has occurred for the Sidelink process in this discovery period.

To generate a transmission, the Sidelink process shall instruct the physical layer to generate a transmission according to the configured grant with the redundancy version corresponding to the CURRENT_IRV value if there is no uplink transmission, no transmission or reception on PSCCH, and no transmission or reception on PSCCH at the time of the transmission, and increment CURRENT_IRV by 1.

After performing above actions, if CURRENT_NWTX_NB=numNewtx; or if the upper layer indicates to stop transmissions of this MAC PDU: if the upper layer indicates to release this Sidelink process: if the upper layer indicates to release the configured grant for this Sidelink process: if the upper layer indicates to stop transmissions of SL-DCH (e.g. due to Radio Link Failure), and if CURRENT_TX_NB=numRetx, the Sidelink process then shall flush the HARQ buffer, and clear the configured grant associated with the Sidelink process.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a User Equipment (UE) operating in a wireless communication system, the method comprising:
   triggering a new transmission of a Medium Access Control (MAC) Protocol Data Unit (PDU) of a sidelink process for a sidelink Hybrid ARQ (HARQ) entity,
   wherein the sidelink HARQ entity is configured with a first counter to count a number of transmissions within a transmission period, and a second counter to count a number of transmission periods; and
   transmitting the MAC PDU in a HARQ buffer of the sidelink process until a value of the first counter reaches a first maximum value and a value of the second counter reaches a second maximum value,
   wherein the value of the second counter is incremented by 1 each time the MAC PDU is transmitted as a new transmission during a first transmission opportunity of each transmission period,
   wherein a value of the first counter is counted only within a last transmission period when the value of the second counter reaches the second maximum value, and
   wherein when the value of the first counter reaches the first maximum value and the value of the second counter reaches the second maximum value, the UE flushes the HARQ buffer.

2. The method according to claim 1, wherein the first counter starts from 0 within the last transmission period.

3. The method according to claim 1, wherein a value of the first counter is increased by 1 each time the MAC PDU is re-transmitted within the last transmission period.

4. The method according to claim 1, wherein the second counter is set to 0 when the UE first transmits the MAC PDU.

5. The method according to claim 1, wherein the MAC PDU is transmitted multiple times across multiple transmission periods until the first counter reaches the first maximum value and the second counter reaches the second maximum value.

6. A User Equipment (UE) operating in a wireless communication system, the UE comprising:
   a transmitter and a receiver; and
   a processor, operatively coupled to the transmitter and the receiver, wherein the processor is configured to:
   trigger a new transmission of a Medium Access Control (MAC) Protocol Data Unit (PDU) of a sidelink process for a sidelink Hybrid ARQ (HARQ) entity, wherein the sidelink HARQ entity is configured with a first counter to count a number of transmissions within a transmission period and a second counter to count a number of transmission periods, and
   control the transmitter to transmit the MAC PDU in a HARQ buffer of the sidelink process until a value of the first counter reaches the first maximum value and a value of the second counter reaches the second maximum value,
   wherein the value of the second counter is incremented by 1, each time the MAC PDU is transmitted as a new transmission during a first transmission opportunity of each transmission period,
   wherein a value of the first counter is counted only within a last transmission period when the value of the second counter reaches the second maximum value, and
   wherein when the value of the first counter reaches the first maximum value and the value of the second counter reaches the second maximum value, the UE flushes the HARQ buffer.

7. The UE according to claim 6, wherein the first counter starts from 0 within the last transmission period.

8. The UE according to claim 6, wherein a value of the first counter is increased by 1 each time the MAC PDU is re-transmitted within the last transmission period.

9. The UE according to claim 1, wherein second counter is set to 0 when the UE first transmits the MAC PDU.

10. The UE according to claim 6, wherein the MAC PDU is transmitted multiple times across multiple transmission periods until the first counter reaches the first maximum value and the second counter reaches the second maximum value.

11. The method according to claim 1, wherein when the value of the second counter does not reach the second maximum value, the UE doesn't count the first counter.

12. The UE according to claim 6, wherein when the value of the second counter does not reach the second maximum value, the UE doesn't count the first counter.

* * * * *